Aug. 11, 1942.   J. F. EVERSOLE ET AL   2,292,561
OLEFIN HYDRATION PROCESS
Filed July 12, 1939   2 Sheets-Sheet 1
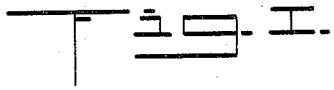
CHART FOR ESTIMATING SATURATION TEMPERATURES WITH HYDRO-
CARBON GAS MIXTURES CONTAINING 70% PROPYLENE BY VOLUME.
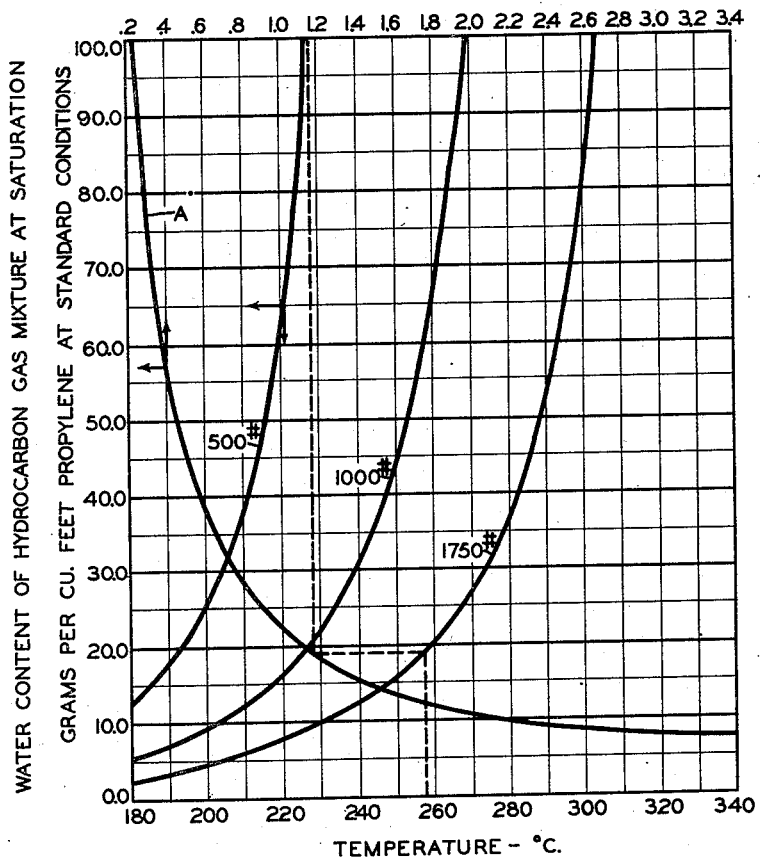
INVENTORS
JAMES F. EVERSOLE
CHARLES W. REHM
EDWARD W. DOUGHTY
BY
ATTORNEY Aug. 11, 1942.  J. F. EVERSOLE ET AL  2,292,561
OLEFIN HYDRATION PROCESS
Filed July 12, 1939   2 Sheets-Sheet 2
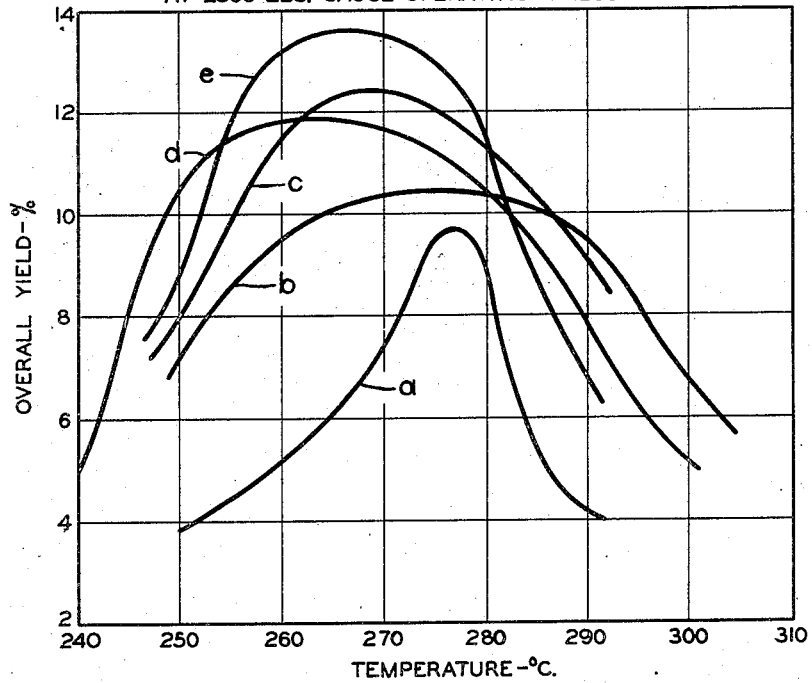
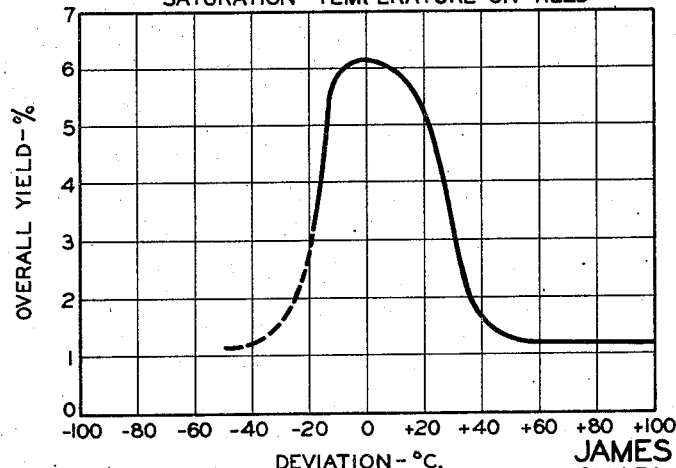
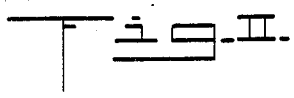
INVENTORS
JAMES F. EVERSOLE
CHARLES W. REHM
EDWARD W. DOUGHTY
BY
ATTORNEY Patented Aug. 11, 1942

UNITED STATES PATENT OFFICE 2,292,561

OLEFIN HYDRATION PROCESS

James F. Eversole and Charles W. Rehm, Kenmore, N. Y., and Edward W. Doughty, South Charleston, W. Va., assignors to Carbide and Carbon Chemicals Corporation, a corporation of New York Application July 12, 1939, Serial No. 283,984

10 Claims. (Cl. 260—641)

This invention is primarily concerned with the production of isopropanol in a practical manner by the catalytic, vapor phase, high-pressure hydration of propylene, and it includes the preparation of a catalyst for use in this process. The invention is applicable as well to the hydration of ethylene to ethanol, and to the hydration of the butylenes and amylenes to the corresponding secondary alcohols.

It is known at the present time that mixtures of olefins may be hydrated in the presence of various catalysts to obtain the corresponding alcohols. The hydration of a single olefin, such as propylene, has also been proposed, particularly in the presence of highly corrosive, acid catalysts, such as sulfuric acid and its salts. However, in operating such processes, costly acid-resistant equipment must be used, and special precautionary measures are necessary to reduce the great hazard involved in operating with corrosive catalysts at high pressures and temperatures. Accordingly, prior processes for hydrating olefins, employing highly corrosive catalysts such as these, are not entirely satisfactory for economical and commercial scale production.

The principal objects of the invention, therefore, are to provide for the preparation of isopropanol economically and in satisfactory yields by the direct hydration of propylene and to provide an inexpensive, insoluble, non-corrosive, solid catalyst of high activity for use in such a hydration process.

The invention, in brief, comprises passing a gaseous mixture of water vapor and olefin, diluted, if desired, by an inert hydrocarbon gas, at a high pressure and an elevated temperature over a suitable catalyst enclosed in an appropriate converter adapted for high pressure operation. The outgoing reactants are treated by suitable means to recover the alcohol formed. The unreacted olefin is preferably recycled by returning it with additional water vapor to the reactants entering the converter.

The catalyst of the present invention may be briefly defined as comprising specially treated alumina as hereafter more fully discussed. The invention will now be described as applied to the hydration of propylene although it is understood that other olefins could be correspondingly treated.

It has been found that, when propylene is hydrated under high pressures in the vapor phase in the presence of the above catalyst, the yield of isopropanol obtained is dependent upon several factors which must be carefully regulated with respect to each other in order to obtain isopropanol in satisfactory and practical yields. For this purpose, it has been found necessary to regulate these factors so that the gaseous mixture being reacted and containing propylene and water is approximately saturated with respect to the water vapor. At the exact saturation point the gaseous mixture contains the maximum amount of water vapor which can be tolerated at the particular operating conditions selected without condensation, in the absence of any extraneous influence, of liquid water droplets from the mixture.

The saturation point of the gaseous mixture is a function of a number of independent variables which consist of the temperature, the pressure, the molar ratio of propylene to steam, and the percentage of inert gas, if such a gas be present. The nature of the physical system comprising the mixture is such that, to regulate the gaseous mixture so that it is saturated with respect to the water vapor, any three of these variables may be selected at will within practical limits but there will then be but a narrow range of values for the fourth variable which will satisfy the requirement that the gaseous mixture be approximately saturated with respect to the water vapor.

It has been found that satisfactory yields of isopropanol by the hydration of propylene in the presence of the catalyst of this invention are only obtained when the composition of the mixture does not materially deviate from the saturation point. Material deviation, either way, towards the completely gaseous side or towards the wet vapor side where liquid water droplets are present greatly reduce the yields obtained.

The practical limits for the variables referred to above are those within which it is desirable to carry out the hydration of propylene in the presence of the aforesaid catalyst and they comprise temperatures of from about 150° C. to about 400° C., pressures of from about 300 to about 6,000 pounds per square inch, propylene-to-steam molar ratios of from about 0.2 to about 4.0 and percentages of inert gas up to about 90%.

A preferred manner of carrying out the invention is to operate with a mixture of propylene and inert hydrocarbon gas, 70% of the mixture by volume being propylene. The pressure and the propylene-to-steam ratio at which it is desired to operate are then selected. However, with the fixing of these three variables, there will then be but one temperature which will satisfy the requirement that the total gas mixture, containing propylene, water vapor, and inert gas, be saturated with respect to the water vapor. This temperature will be referred to hereinafter in the specification, drawings, and claims as the saturation temperature.

The saturation temperature for such a gas mixture may be estimated from the chart in Figure I which relates, in the curve marked A, the propylene-to-steam ratio to the actual water vapor content of the gas mixture expressed in grams of water per cubic foot of propylene at standard conditions. The other group of curves expresses the amount of water vapor in the total gas mixture at the saturation temperature for different gauge pressures. This group of curves is derived by calculations based on Dalton's law of additive partial pressures. In these calculations are neglected, among other things, the deviations of the gas mixture from Dalton's law. Since this deviation increases with the pressure, becoming considerable in this case at pressures about 1750 pounds per square inch, the chart provides only a close approximation to the true saturation temperature. Exact values can be determined by applying corrections known to those skilled in the art. Exact corrections would also include accounting for in the calculations the effect of water being removed in the reaction, the effect of the presence of isopropanol and hydrocarbon gases upon the vapor pressure of water, and the effect of the adsorptive forces and solubility of the catalytic materials.

To illustrate the manner of using the chart, assume that it is desired to find the saturation temperature for a gas mixture in which exists a propylene to steam ratio of 1.18, and which is under a pressure of 1750 pounds per square inch. The intercept on curve A for this propylene steam ratio is found and a line extended horizontally through this intercept to intersect the curve for pressures of 1750 pounds per square inch. A line drawn vertically through this latter intercept, intersects the temperature axis at 257° C., the desired saturation temperature.

If it desired to operate with hydrocarbon gas mixtures containing percentages of propylene other than 70%, or at pressures higher than 1750 pounds per square inch, the curves shown in Figure 1 are no longer applicable to estimate the saturation temperature but similar curves, or equivalent methods of computation, can be readily utilized by those skilled in the art.

The data presented in the following table show the effect of slight deviations from the saturation temperature on the yield of isopropanol obtained during practical operation of the process.

In the following table, each run was conducted for one hour at an operating pressure of 1750 pounds per square inch, and at a propylene concentration of approximately 70% by volume of the hydrocarbon feed; the volume of the catalyst was 500 cubic centimeters and the outlet space velocity was kept approximately constant at values between 454 and 610 liters of propylene per liter of catalyst per hour.

Table I

|  | Run No. | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Temperature °C | 380 | 326 | 300 | 284 | 254 | 270 | 285 | 260 | 255 | 260 |
| Propylene to steam-molar ratio | 0.57 | 0.53 | 0.95 | 1.31 | 2.94 | 1.27 | 0.80 | 1.18 | 0.77 | 0.76 |
| Outlet gas liters propylene | 228 | 227 | 254 | 302 | 234 | 305 | 254 | 276 | 229 | 236 |
| Proylene reacted grams | 5.94 | 5.4 | 10.8 | 15.1 | 17.0 | 35.2 | 31.5 | 32.2 | 26.5 | 15.5 |
| Isopropanol recovered grams | 7.06 | 7.6 | 15.3 | 21.5 | 24.1 | 50.1 | 44.8 | 45.9 | 37.7 | 22.0 |
| Efficiency propylene to isopropanol | 83.2 | 98.2 | 99.2 | 99.4 | 99.4 | 99.8 | 99.8 | 99.8 | 99.7 | 99.5 |
| Over-all yield percent | 1.20 | 1.23 | 2.20 | 2.58 | 3.72 | 5.77 | 6.20 | 5.84 | 5.78 | 3.54 |
| Saturation temperature from fig. 1 °C | 282 | 284 | 265 | 253 | 224 | 254 | 272 | 257 | 273 | 274 |
| Deviation of operating temperature from saturation temperature °C | +98 | +42 | +35 | +31 | +30 | +16 | +13 | +3 | −18 | −14 |

Part of this data is presented in graphical form in Figure II to show more clearly the relationship between the yield of isopropanol obtained and the maintenance of the saturation temperature in the gas mixture undergoing reaction. Positive deviations from the saturation temperature are towards the completely gaseous state of the mixture and negative deviations are towards the wet vapor state where liquid water droplets are present. It is apparent that the optimum conditions for the reactions are those in which liquid water is at the incipient point of condensation from the gaseous mixture. This fact is not only characteristic of the invention but it is also true that material deviations from the saturation temperature reduce the yields obtained to a point where the process is economically undesirable although not technically inoperative. A material deviation for the purpose of this invention is a deviation of about ±40° C. from the saturation temperature and it is preferable that this deviation does not exceed ±20 C.

The catalyst of this invention essentially consists of a catalytic, activated form of alumina which has been sensitized, by treatment with compounds containing sulfate or sulfite radicals, so that it promotes the formation of alcohol in good yields when the reaction conditions are properly adjusted.

Several embodiments of this catalyst may be used, and these will be discussed below. The catalyst employed in the series of experiments described in Table I was prepared by treating commercial activated alumina with boiling solutions of weak sulfuric acid, the acid concentration used varying between 5% to 10%, for from 15 to 30 minutes. After this treatment, the acid solution was decanted and the treated alumina thoroughly washed with boiling water until the wash water was neutral, or practically neutral, to litmus. The catalyst thus prepared was solid, non-corrosive, and water-insoluble. In contrast to the original alumina, this catalyst was highly effective in promoting a high yield of isopropanol by the direct hydration of propylene when applied under the particular conditions specified above. Moreover, in further contrast to alumina, the conversion of the propylene is almost entirely to isopropanol, only traces of isopropyl ether being found in the tests conducted.

Further experiments using this particular catalyst were carried out and it was discovered that the yields obtained when operating at the saturation temperature could be materially increased by operating at substantially higher pressures. The following table gives the operating conditions at which these experiments were performed, the operating temperature in each case being the saturation temperature. The saturation temperatures were computed from the other variables given using methods of computation known to those skilled in the art. When operating at these higher pressures, the corrections referred to before in the computation of the saturation temperature are material and should be taken into consideration.

Since all other operating conditions were maintained approximately constant, the increased yields obtained in these experiments can be most likely attributed to the higher pressures employed.

*Table II*

| | Run No. | | |
|---|---|---|---|
| | 1 | 2 | 3 |
| Time hours | 2.0 | 2.0 | 1.0 |
| Propylene in hydrocarbon feed percent | 78.0 | 08.0 | 79 |
| Temperature °C | 293 | 281 | 277 |
| Operating pressure lbs. per sq. in. | 2,500 | 2,500 | 2,500 |
| Propylene-to-steam molar ratio | 0.41 | 0.53 | 0.56 |
| Steam added grams | 1,197 | 960 | 440 |
| Volume of catalyst cubic centimeters | 500 | 500 | 500 |
| Outlet space velocity—liter of propylene per liter of catalyst per hour | 553 | 571 | 558 |
| Outlet gas—liters propylene | 553 | 571 | 279 |
| Propylene reacted grams | 117.4 | 107.8 | 57.3 |
| Isopropanol recovered do | 167 | 152.3 | 81.4 |
| Efficiency—propylene to isopropanol percent | 99.5 | 99.1 | 99.5 |
| Over-all yield do | 10.1 | 9.07 | 9.80 |

Catalysts equal in effectiveness to those described above may be prepared by treating alumina, which may be the commercial form known as activated alumina, with an aqueous solution of sulfur dioxide or of aluminum sulfate. The treatment with aluminum sulfate is conducted at a temperature of about 100° C. for a convenient length of time, which may be 15 minutes or longer. The amount of aluminum sulfate ($Al_2(SO_4)_3 \cdot 18H_2O$) used is preferably equal to 20% to 50% of the weight of the original alumina. At the end of the treatment, the supernatant liquid is drawn off and the catalyst consists of alumina combined with the major portion of the aluminum sulfate to form an insoluble, neutral, non-corrosive material. The catalyst is ready for use after drying at about 100° C. Alternatively other sulfates of acidic character, including those of copper, cerium, chromium, iron, zinc, and ammonium, may be substituted for aluminum sulfate in the above treatment.

It is characteristic of the catalysts described above that slight deviations of operating temperatures from the saturation temperature during the hydration of propylene results in an abrupt decrease in the yield of isopropanol obtained. This has already been pointed out in the discussion of the curve shown in Fig. II in which the operating pressure was 1750 pounds per square inch. The same relationship prevails where other operating pressures are employed and the curve marked $a$ in Fig. III illustrates this relationship. In deriving this curve, the propylene-to-steam ratio, the pressure, and other variables were kept constant and the temperature was permitted to vary from the saturation temperature of 277° C. at which the peak yield of 9.7% was obtained. As the temperature is lowered from the saturation temperature into the region where liquid water condenses from the mixture, or as the temperature is raised into the completely gaseous region, the yield of isopropanol produced abruptly declines.

Operation of the process on a large scale using catalysts of the unusual characteristics discussed above involves close control of the temperature and other variables so that the saturation temperature is maintained throughout the converter. As the reactants proceed through the converter, a small amount of heat of reaction is evolved and also the percentage by volume of inert gas, if such a gas is present, will rise because of the combination of one mol of propylene with one mol of water vapor to form but one mol of isopropanol vapor.

The effect of these minor changes in the reaction conditions will be to cause the operating temperature, at some points in the converter, to deviate from the saturation temperature. These effects may be corrected by appropriate heat exchange in the converter and by the introduction of new amounts of reactants into the converter at appropriate points or by other means known to those skilled in engineering science.

However, it has been found that the necessity for such close control of the operating conditions may be practically eliminated by appropriate treatment of the alumina prior to the sensitizing operation. The treatment comprises etching the granular activated alumina with a solution of alkali metal hydroxide, washing the treated catalyst to remove the caustic solution, and thereafter neutralizing any unremoved caustic with an appropriate acid, such as sulfuric. The sensitizing operation may then be carried out by using either dilute sulfuric acid or sulfate salts of slightly basic metals as discussed above.

As a result of this treatment, the ability of the catalyst to promote a high yield of isopropanol is made less sensitive to minor deviations from the saturation temperature in the operation of the process. In addition, the yields obtained when operating at the saturation temperature are materially increased. These improvements are shown in the curves lettered $b$, $c$, $d$, and $e$ in Fig. III, where, in each case, the alumina catalyst was given an initial etching treatment with caustic. These curves were derived in the same manner as that previously discussed for curve $a$ of this drawing. The peak of each curve represents the yield obtained when operating at the saturation temperature. Although the sensitiveness of the alkali treated catalyst to minor deviations from the saturation temperature is not critical, it is true, even with the improved catalysts, that material deviations of about ±40° C. from the saturation temperature reduce the yields to values economically undesirable.

The catalyst used in deriving the data of curve $b$ was prepared by initially treating 6 to 10 mesh activated alumina with a boiling 40% solution of sodium hydroxide for five minutes. The treated catalyst was washed, neutralized with sulfuric acid, and again washed. It was then boiled with a 10% solution of sulfuric acid, and then washed free from acid and dried.

The catalyst used in deriving the data of curve $c$ was prepared by initially treating the alumina with 20% sodium hydroxide solution and thereafter digesting the alkali treated catalyst with a boiling 20% solution of aluminum sulfate for 15 minutes. The catalyst was washed until the wash water was neutral, or practically neutral, to litmus, and dried at ordinary temperatures.

The catalyst used in deriving the data of curve $d$ was prepared by treating the alkali etched alumina with a boiling 50% solution of sulfuric acid, and thereafter washing the catalyst until free from acid and drying.

The catalyst used in deriving the data of curve $e$ was prepared by treating the alkali-etched alumina with a solution of sulfur dioxide in water (sulfurous acid) and thereafter washing the catalyst until free from acid and drying.

The above process has been discussed with particular reference to the hydration of propylene to isopropanol. The principles devolved in this discussion are also applicable to the direct hydration of ethylene to ethanol and, to the hydration of the butylenes and amylenes to the corresponding secondary alcohols.

We are aware that it has previously been proposed to hydrate olefins to the corresponding alcohols by passing the olefins mixed with water vapor at a high pressure and temperature over various catalysts, including alumina. This invention is based on the discovery that a non-corrosive, non-acidic catalyst prepared by incorporating sulfate or sulfite radicals with an alumina catalyst is highly effective in hydrating olefins to the corresponding alcohols when the gaseous mixture containing the olefin and steam is maintained at a temperature not materially deviating from the saturation temperature for that mixture. The practice of our invention is facilitated by the ancillary discovery that the effectiveness of the catalyst in our invention can be increased by caustic treatment of the alumina prior to its incorporation with the sulfate or sulfite radicals. We believe that this invention provides a method for hydrating olefins to the correspondings alcohols in better yields than have heretofore been obtained by any method except possibly those which involve a corrosive acid catalyst or the making of an intermediate sulfate ester of the alcohol.

Many modifications of our invention will be readily apparent to those skilled in the art and are included within the scope of the invention as defined by the appended claims.

We claim:

1. Process for making alcohols which comprises passing at an elevated temperature and under a relatively high pressure a gaseous mixture containing as essential ingredients appreciable amounts of water vapor and an olefin over a catalyst enclosed in a confined space and essentially comprising alumina which has been treated with a sensitizing substance containing at least one radical selected from the group consisting of sulfate and sulfite and thereafter sufficiently freed from acidic substances to form a substantially non-corrosive and water-insoluble material; the pressure, temperature and ratio of olefin to water in said mixture being so correlated that the gaseous mixture ranges in state from those in which condensation of liquid water is incipient to those in which complete evaporation of a liquid water phase is incipient; and recovering an alcohol corresponding to said olefin from the effluent gases.

2. Process for making alcohols which comprises passing a gaseous mixture containing as essential ingredients appreciable amounts of water vapor and an olefin containing less than six carbon atoms over a catalyst enclosed in a confined space and essentially comprising alumina which has been treated with a sensitizing substance containing at least one radical selected from the group consisting of sulfate and sulfite and thereafter sufficiently freed from any acidic substances remaining from the sensitizing treatment to form a substantially non-corrosive and water-insoluble material; the pressure of the mixture being selected from values ranging from about 300 to about 6000 pounds per square inch, the olefin-to-water molar ratio from values ranging from about 0.2 to about 4, and the temperature being selected from values ranging from about 150° C. to about 400° C. and not deviating by more than about 40° C. from the saturation temperature for said mixture; and recovering an alcohol corresponding to said olefin from the effluent gases.

3. Process for making isopropanol which comprises passing at an elevated temperature and under a pressure of at least 300 pounds per square inch a gaseous mixture containing as essential ingredients appreciable amounts of water vapor and propylene over a catalyst enclosed in a confined space and essentially comprising alumina which has been treated with a sensitizing substance containing at least one radical selected from the group consisting of a sulfate and sulfite and thereafter sufficiently freed from acidic substances to form a substantially non-corrosive and water-insoluble material; the pressure, temperature, and ratio of propylene-to-water in said mixture being so correlated that the mixture ranges in state from those in which condensation of liquid water is incipient to those in which complete evaporation of a liquid water phase is incipient; and recovering isopropanol from the effluent gases.

4. Process for making ethanol which comprises passing at an elevated temperature and under a pressure of at least 300 pounds per square inch a gaseous mixture containing as essential ingredients appreciable amounts of water vapor and ethylene over a catalyst enclosed in a confined space and essentially comprising alumina which has been treated with a sensitizing substance containing at least one radical selected from the group consisting of sulfate and sulfite and thereafter sufficiently freed from acidic substances to form a substantially non-corrosive and water-insoluble material; the pressure, temperature, and ratio of ethylene-to-water in said mixture being so correlated that the mixture ranges in state from those in which condensation of liquid water is incipient to those in which complete evaporation of a liquid water phase is incipient; and recovering ethanol from the effluent gases.

5. Process for making isopropanol which comprises passing a gaseous mixture containing as essential ingredients appreciable amounts of water vapor and propylene over a catalyst enclosed in a confined space and essentially comprising alumina which has been treated with a sensitizing substance containing at least one radical selected from the group consisting of sulfate and sulfite and thereafter sufficiently freed from acidic substances to form a substantially non-corrosive and water-insoluble material; the pressure of the mixture being selected from values ranging from about 300 to about 6000 pounds per square inch, the propylene-to-water molar ratio from values ranging from about 0.2 to about 4, and the temperature being selected from values ranging from about 150° C. to about 400° C. and not deviating by more than about 40° C. from the saturation temperature for said mixture; and recovering isopropanol from the effluent gases.

6. Process for making ethanol which comprises passing a gaseous mixture containing as essential ingredients appreciable amounts of water vapor and ethylene over a catalyst enclosed in a confined space and essentially comprising alumina which has been treated with a sensitizing substance containing at least one radical selected from the group consisting of sulfate and sulfite and thereafter sufficiently freed from acidic substances to form a substantially non-corrosive and water-insoluble material; the pressure of the mixture being selected from values ranging from about 300 to about 6000 pounds per square inch, the ethylene-to-water molar ratio from values ranging from about 0.2 to about 4, and the temperature being selected from values ranging from about 150° C. to about 400° C. and not deviating by more than about 40° C.

from the saturation temperature for said mixture; and recovering ethanol from the effluent gases.

7. Process for making alcohols which comprises passing a gaseous mixture containing as essential ingredients appreciable amounts of water vapor and an olefin over a catalyst enclosed in a confined space and essentially comprising alumina which has been treated with a sensitizing acid containing at least one radical selected from the group consisting of sulfate and sulfite and thereafter sufficiently freed from acidic substances to form a substantially non-corrosive and water-insoluble material; the pressure of the mixture being selected from values ranging from about 300 to about 6000 pounds per square inch, the olefin-to-water molar ratio from values ranging from about 0.2 to about 4, and the temperature being selected from values ranging from about 150° C. to about 400° C. and not deviating by more than about 40° C. from the saturation temperature for said mixture; and recovering an alcohol corresponding to said olefin from the effluent gases.

8. Process for making alcohols which comprises passing a gaseous mixture containing as essential ingredients appreciable amounts of water vapor and an olefin over a catalyst enclosed in a confined space and essentially comprising alumina which has been treated with a sensitizing acidic sulfate salt and thereafter sufficiently freed from acidic substances to form a substantially non-corrosive and water-insoluble material; the pressure of the mixture being selected from values ranging from about 300 to about 6000 pounds per square inch, the olefin-to-water molar ratio from values ranging from about 0.2 to about 4, and the temperature being selected from values ranging from about 150° C. to about 400° C. and not deviating by more than about 40° C. from the saturation temperature for said mixture; and recovering an alcohol corresponding to said olefin from the effluent gases.

9. Process for making alcohols which comprises passing at an elevated temperature and under a pressure of at least 300 pounds per square inch a gaseous mixture containing as essential ingredients appreciable amounts of water vapor and an olefin over a catalyst, enclosed in a confined space and essentially comprising alumina which has been initially treated in solid form with an alkali metal hydroxide, subsequently treated with a sensitizing substance containing at least one radical of the group consisting of sulfate and sulfite, and thereafter sufficiently freed from acidic substances to form a substantially non-corrosive and water-insoluble material; the pressure, temperature and ratio of olefin to water in said mixture being so correlated that the temperature of said gaseous mixture does not deviate by more than about 40° C. from the saturation temperature for said mixture.

10. Process for making alcohols which comprises passing a gaseous mixture containing as essential ingredients appreciable amounts of water vapor and propylene over a catalyst, enclosed in a confined space and essentially comprising alumin which has been initially treated in solid form with an alkali metal hydroxide, subsequently treated with a sensitizing substance containing at least one radical of the group consisting of sulfate and sulfite, and thereafter sufficiently freed from acidic substances to form a substantially non-corrosive and water-insoluble material; the pressure of the mixture being selected from values ranging from about 300 to about 6000 pounds per square inch, the propylene-to-water molar ratio from values ranging from about 0.2 to about 4, and the temperature being selected from values ranging from about 150° C. to about 400° C. and not deviating by more than about 40° C. from the saturation temperature for said mixture, and recovering isopropanol from the effluent gases.

JAMES F. EVERSOLE.
CHARLES W. REHM.
EDWARD W. DOUGHTY.

CERTIFICATE OF CORRECTION.

Patent No. 2,292,561.   August 11, 1942.

JAMES F. EVERSOLE, ET AL.

It is hereby certified that error appears in the printed specification of the above numbered patent requiring correction as follows: Page 1, second column, line 59, for "vaport" read --vapor--; page 3, first column, Table II, third column thereof, for "08.0" read --80.0--; and second column, line 32, for "eachc" read --each--; line 69, for "devolved" read --developed--; page 4, second column, line 6, claim 3, strike out "a"; page 5, second column, line 25, claim 10, for "alumin" read --alumina--; and that the said Letters Patent should be read with this correction therein that the same may conform to the record of the case in the Patent Office.

Signed and sealed this 15th day of September, A. D. 1942.

Henry Van Arsdale, (Seal)   Acting Commissioner of Patents.